United States Patent
Campos Perez et al.

(10) Patent No.: US 11,249,888 B1
(45) Date of Patent: Feb. 15, 2022

(54) SYSTEM AND METHOD FOR GENERATING COUNTEREXAMPLE TESTS OF INCIDENTAL INVARIANTS

(71) Applicant: Palo Alto Research Center Incorporated, Palo Alto, CA (US)

(72) Inventors: Alexandre Campos Perez, San Mateo, CA (US); Eric A. Bier, Palo Alto, CA (US); Johan de Kleer, Los Altos, CA (US); Ron Z. Stern, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/035,470

(22) Filed: Sep. 28, 2020

(51) Int. Cl.
*G06F 11/36* (2006.01)

(52) U.S. Cl.
CPC ...... *G06F 11/3684* (2013.01); *G06F 11/3688* (2013.01); *G06F 11/362* (2013.01)

(58) Field of Classification Search
CPC ............................................. G06F 11/36–3696
See application file for complete search history.

(56) References Cited

U.S. PATENT DOCUMENTS

| | | | | |
|---|---|---|---|---|
| 7,689,399 B1* | 3/2010 | Hangai | ............... | G06F 30/3323 703/14 |
| 8,381,148 B1* | 2/2013 | Loh | ....................... | G06F 30/327 716/106 |
| 9,021,409 B2* | 4/2015 | Vasudevan | .......... | G06F 30/3323 716/106 |
| 2013/0019216 A1* | 1/2013 | Vasudevan | .......... | G06F 30/3323 716/106 |

* cited by examiner

*Primary Examiner* — Todd Aguilera
(74) *Attorney, Agent, or Firm* — Shun Yao; Park, Vaughan, Fleming & Dowler LLP

(57) ABSTRACT

One embodiment provides a system and method for identifying invariants in a software system. During operation, the system executes a test suite comprising a plurality of tests associated with the software system to output a list of likely invariants in the software system, and performs a test-generation operation attempting to generate counterexample tests for the likely invariants. In response to a counterexample test being successfully generated for a first likely invariant, the system removes the first likely invariant from the list of likely invariants and adds the successfully generated counterexample test to the test suite.

15 Claims, 6 Drawing Sheets

SYSTEM AND METHOD FOR GENERATING COUNTEREXAMPLE TESTS OF INCIDENTAL INVARIANTS

RELATED APPLICATION

This application is related to U.S. patent application Ser. No. 17/035,485, entitled "SYSTEM AND METHOD FOR IDENTIFYING A FAULTY COMPONENT IN A SPECTRUM AMBIGUITY GROUP," filed Sep. 28, 2020, the disclosure of which is herein incorporated by reference in its entirety.

BACKGROUND

Field

This disclosure is generally related to automatic software development and debugging tools. More specifically, it is related to a system and method that can automatically generate counterexample tests of incidental invariants.

Related Art

In recent years, new tools have been developed to help software engineers write better software and maintain software with less effort. Automated tools can now observe and record the runtime behavior of software programs and infer dynamic properties that hold in all observed executions (i.e., invariants). For example, such a tool may detect that a variable, age, is always non-negative and less than 200. Such inferred properties can be used in different ways, such as helping developers check whether they have sufficiently tested their applications and generating dynamic assertions, which stop execution in case a property does not hold, ensuring that the system runs predictably. The function performed by these tools is sometimes called likely invariant (LI) detection, and these tools are referred to as LI-detection tools.

An LI-detection tool will generally require a set of test cases (called a test suite) that trigger multiple executions of the software under development. Note that the set of patterns that will be observed depends critically on the set of tests that are run. In the aforementioned example of the age variable, the test suite might initially be built from a database containing information about teenagers, such that all of the tests might produce ages in the range 13-19. After running the full test suite, the LI-detection tool might propose that the age variable has a range property of being between 13 and 19. Such a property can be referred to as an incidental invariant. The incidental invariants can be misleading to the software developer. To prevent the LI-detection tool from detecting incidental invariants, properly designed tests are needed.

SUMMARY

One embodiment provides a system and method for identifying invariants in a software system. During operation, the system executes a test suite comprising a plurality of tests associated with the software system to output a list of likely invariants in the software system, and performs a test-generation operation attempting to generate counterexample tests for the likely invariants. In response to a counterexample test being successfully generated for a first likely invariant, the system removes the first likely invariant from the list of likely invariants and adds the successfully generated counterexample test to the test suite.

In a variation on this embodiment, in response to failing to generate a counterexample test for a second likely invariant, the system computes a likelihood score for the second likely invariant based on the test-generation operation. The likelihood score indicates the likelihood of the second likely invariant being a true invariant.

In a further variation, the system ranks remaining likely invariants in the list of likely invariants based on their likelihood scores, and outputs a set of top-ranked likely invariants.

In a further variation, the system presents the set of top-ranked likely invariants to a software developer, and receives feedback from the software developer, the feedback indicating whether a likely invariant is confirmed as an invariant.

In a variation on this embodiment, performing the test-generation operation comprises one or more of: implementing a fuzzing-based test-generation technique, implementing a program-analysis-based test-generation technique, and implementing a heuristic-search-based test-generation technique.

In a further variation, implementing the fuzzing-based test-generation technique can include: modifying an input of a test in the test suite, monitoring a value of a variable describing a likely invariant while executing the test, computing a gradient based on a change in the input and a change in the monitored value of the variable, and generating a new test by modifying the input based on the computed gradient.

In a further variation, implementing the program-analysis-based technique can include: identifying at least a variable describing a likely invariant, instrumenting the software system to add a code branch to monitor runtime values of the variable, and using a program-analysis technique to generate a test to pass through the added code branch.

In a further variation, implementing the heuristic-search-based test-generation technique can include: generating and executing a test, and computing a fitness function for the generated test based on whether executing the test breaks a likely invariant or whether the test covers a code branch associated with the likely invariant.

BRIEF DESCRIPTION OF THE FIGURES

In the figures, like reference numerals refer to the same figure elements.

DETAILED DESCRIPTION

Figure 1:
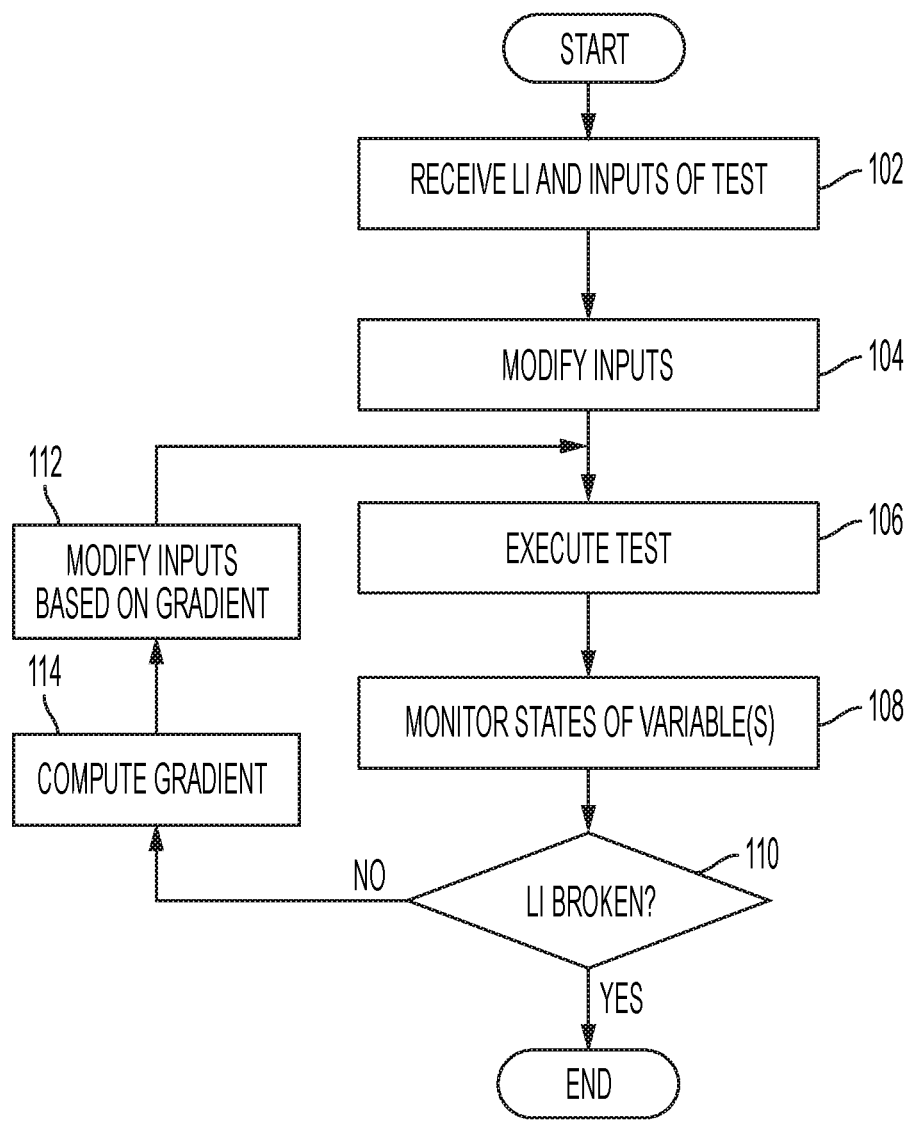
FIG. 1 illustrates an exemplary process for generating a counterexample test for a likely invariant (LI), according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of false detection of invariants. Automatic likely invariant (LI)-detection tools may falsely detect incidental invariants due to usage of inadequate test suites and present those incidental invariants as invariants to programmers, thus misleading the programmers in their efforts to develop and/or maintain the software. It is desirable to prevent the LI-detection tools from misjudging incidental invariants as invariants. In some embodiments, a test-generation system can automatically generate tests that act as counterexamples to incidental invariants, thus achieving the goal of suppressing the false detection of the incidental invariants. More specifically, the test-generation system can mine the LIs (which may include incidental invariants) detected by the LI-detection tool to guide the generation of test inputs. For each LI, the test-generation system attempts to generate a counterexample test (i.e., a system execution in which a mined LI does not hold). In one embodiment, the test-generation system can implement a fuzz-testing technique, which generates tests by manipulating a given input to the system-under-test (SUT) and executing the SUT on the manipulated input, with the goal of generating an input that will break the LI. In one embodiment, the test-generation system can implement a program-analysis technique that performs static and dynamic analysis of source code and generate tests aimed at specific branches of the code. In yet another embodiment, the test-generation system can use a generate-and-test via heuristic search approach, in which the test suite is generated by constructing a sequence of statements and assertions, and the resulting test suite is evaluated by a fitness function that guides the search for other sequences of statements and assertions. The fitness function can be assigned a positive value whenever branches relevant to an LI are covered and an even higher value if the LI is broken. LIs with counterexample tests generated are removed from the list of LIs. On the other hand, if the test-generation system fails to generate a counterexample test for an LI, it can output a score that indicates the degree of confidence that no such counterexample exists.

Automatic Test-Generation System

A typical invariant-detection tool can detect invariants by executing the software system that is under test on a collection of inputs (i.e., a test suite) and infer invariants from captured variable traces. The inferred invariants can then be presented to the software developer to guide further software development. Identifying invariants can be very useful for maintaining software quality. For example, by logging the events that break the invariants, one can detect and diagnose faults. Once the invariants are correctly identified, they can be explicitly annotated, thus improving the code readability. Identifying the invariants also improves model-based reasoning for software. Moreover, it can stop the developer from inadvertently violating the assumptions upon which the program's correct behavior depends. In an ideal world, the test suite is extensive and contains enough tests to correctly identify the invariants in a software system. However, in many situations, the executed test suite may not be adequately extensive, thus resulting in the invariant-detection tool discovering and recommending to software developers invariants that do not hold in general for the software system under test. Such invariants, called incidental invariants, can be misleading to the software developer. To prevent the invariant-detection tool from the false detection of the incidental invariants, it is important to ensure that the test suite is extensive enough such that any incidental invariant can be broken by one or more tests. A test that breaks an incidental invariant can be referred to as a counterexample test, because executions of the test lead to the variable under investigation exhibiting a different property.

In the previously mentioned age variable example, generating a counterexample test to break the incidental invariant can be straightforward (e.g., by adding tests that pass numbers outside of the incidental range as the value of age). However, in many cases, generating counterexamples for incidental invariants can be challenging. For example, the variable of interest may be the result of a computation, and to make matters worse, the computation that produces the variable may have many steps and may be deeply nested inside of the software system. In such a case, it may be difficult to discover which inputs a test should provide that will force the variable to be assigned the desired value.

Existing approaches for automated test generation focus on creating tests that exercise as many code regions as possible. These tests are called code coverage and can fall into three categories: random testing, symbolic-execution-based testing, and search-based testing. Random testing approaches generate random program inputs to exercise a system. For example, a random test generator can first randomize test inputs and then incorporate feedback (which can be, for example, in the form of branch coverage) from previously generated tests to guide the generation of subsequent tests. Symbolic-execution-based testing tools symbolically execute the system under test. Symbolic execution treats program inputs as symbols instead of concrete values and propagates these symbols across the program. This approach allows the testing tool to generate a set of constraints on input values such that execution follows a desired path across the program. Furthermore, certain tools can mix symbolic execution on relevant code regions with concrete executions of the remaining program to improve performance. Such an approach is often called concolic execution. Search-based testing tools use heuristic search techniques to automate the process of generating test inputs. These tools encode the current set of tests as a fitness function to be optimized. Common metrics that serve as fitness functions include (branch/statement/decision) coverage, mutation kill rate (i.e., the extent to which tests fail after a mutation that causes the program to have incorrect behavior), and test entropy. However, these existing approaches are not suitable for generating tests that act as counterexamples to incidental invariants, which require more focused testing.

To generate counterexample tests, modifications to existing test-generation approaches are needed. In some embodiments, various techniques have been developed to facilitate the automated generating of the counterexample test. In one embodiment, a fuzzing technique can be used to generate counterexample tests. Fuzzing, or fuzz testing, refers to an automated software testing technique that involves providing invalid, unexpected, or random data as inputs to a computer program and monitoring the computer program for exceptions (e.g., crashes or exhibiting vulnerabilities). Certain fuzzing test tools (sometime called Fuzzers) can generate new test inputs by manipulating the inputs of existing tests. To generate counterexample tests, the test-generation tool can manipulate the inputs of tests in the current test suite, and check if the resulting executions invalidate some of the LIs outputted by the LI-detection tool. To guide the fuzzing process, the test-generation tool can compute a gradient of the change in the variable(s) describing the LI with respect to the amount of change in the inputs, and then use the size of the gradient to guide the size and sign of the changes in subsequent iterations of fuzzing.

FIG. 1 illustrates an exemplary process for generating a counterexample test for an LI, according to one embodiment. During operation, the system receives an LI and a set of inputs of a test used to infer the LI (operation 102). The system modifies the inputs (operation 104) and executes the test (operation 106). At this initial stage, while executing the test, the system monitors states of the variable(s) describing the LI (operation 108). To do so, the software system under test may be instrumented appropriately. For example, if the LI is "0<age<200," the software system can be instrumented (e.g., within certain code regions) to monitor the value of the variable age. Detailed descriptions regarding instrumenting the SUT to monitor runtime variable values can be found in copending U.S. patent application Ser. No. 17/035,485, entitled "SYSTEM AND METHOD FOR IDENTIFYING A FAULTY COMPONENT IN A SPECTRUM AMBIGUITY GROUP," filed Sep. 28, 2020, the disclosure of which is herein incorporated by reference in its entirety.

Subsequent to obtaining the runtime states of the variable (s), the system can determine whether the LI is broken based on the monitored variable states (operation 110). If so, the system ends operation, as the counterexample test is generated. If not, the system computes a gradient of the change in the variable(s) with respect to the amount of changes in the inputs (operation 112). The system can further modify the inputs based on the computed gradient (operation 114), and re-execute the tests (operation 106).

In an alternative embodiment, a program-analysis-based technique can be used to generate counterexample tests. Unlike the symbolic execution of the software SUT, the test-generation tool can use the program-analysis technique (including both static and dynamic program analysis) to focus on the variable(s) of interest (i.e., variables that describe the LI) and work backward from the desired values to find good counterexample tests. For example, consider a variable v for which there is an LI of the form "v>0," where the value of v is computed in a nested call graph where method A calls method B, which calls method C. Applying static and/or dynamic analysis of the call graph can discover inputs to C that generate values of v that break the LI (i.e., values less than zero). Then, the same form of analysis can be used to find inputs to B that generate those values for C, and finally to find inputs to A that will generate the needed inputs to B. The counterexample generated will send values to C that break the LI "v>0."

Figure 2:
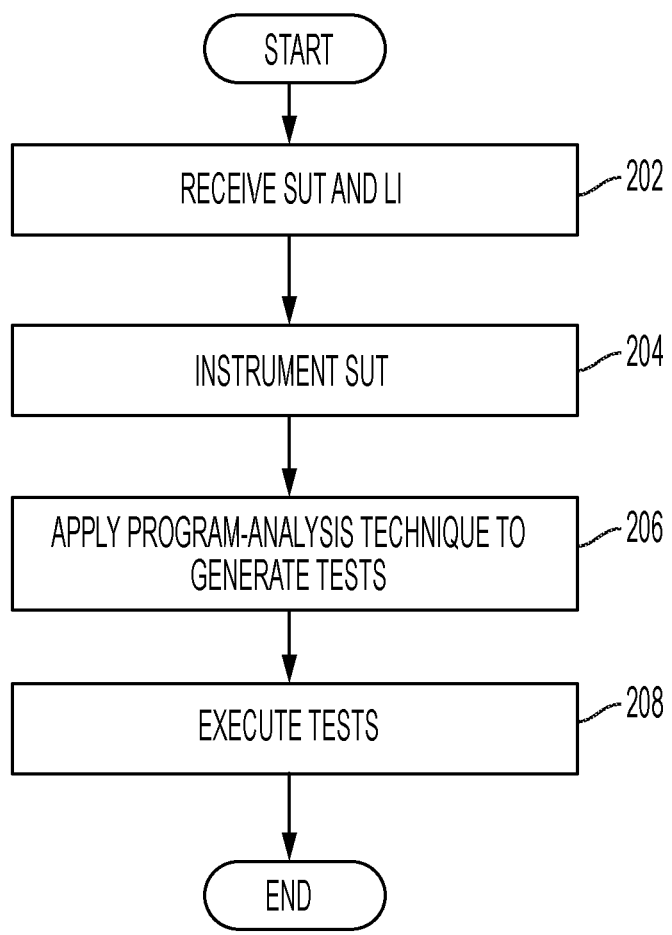
FIG. 2 illustrates an exemplary process for generating a counterexample test for an LI, according to one embodiment.

FIG. 2 illustrates an exemplary process for generating a counterexample test for an LI, according to one embodiment. During operation, the system receives an SUT and an LI (operation 202) and instruments the SUT by adding a specific branch or branches of code to the SUT that can be used to check during runtime if the LI has been broken or not (operation 204). The system can then use the static and/or dynamic program-analysis technique to generate tests that pass through the instrumented branch or branches (operation 206). Subsequently, the system executes the generated tests to determine if the LI is broken (operation 208).

In yet another embodiment, a generate-and-test via heuristic search approach is used to generate the counterexample tests. Generate-and-test refers to the technique of first generating a test suite by constructing a sequence of statements and assertions, and then evaluating the resulting test suite according to a fitness function that guides the search for other sequences of statements and assertions. Conventional approaches may use common fitness functions that consider information about code coverage or certain extreme cases. To generate counterexample tests, the above-mentioned fitness function can be modified. In one example, a positive value can be added to the code-coverage fitness function, if a branch of the code relevant to the LI is covered. In another example, a higher positive value can be added to the code-coverage fitness function if executing the test results in the LI being broken.

Figure 3:
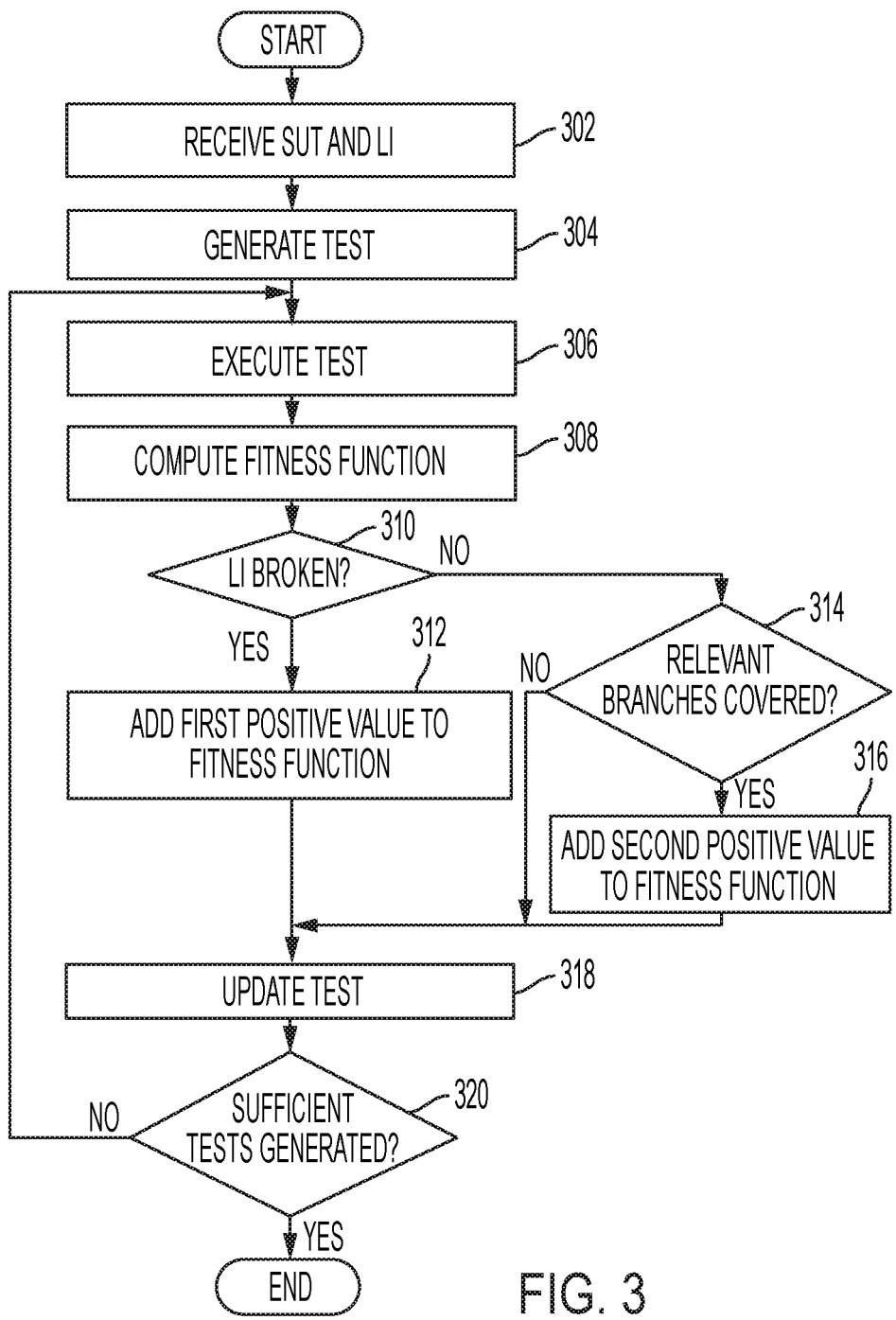
FIG. 3 illustrates an exemplary process for generating a counterexample test for an LI, according to one embodiment.

FIG. 3 illustrates an exemplary process for generating a counterexample test for an LI, according to one embodiment. During operation, the system receives an SUT and an LI (operation 302) and generates a test for the SUT (operation 304). Generating the test can involve constructing a sequence of statements and assertions. The system executes the test (operation 306). Based on the execution, the system computes a code-coverage fitness function (operation 308). For example, the code-coverage fitness function can be determined based on a percentage of code regions covered by the test. The system can then determine if the LI is broken (operation 310). For example, the system can monitor the runtime value of variables defining the LI to determine if the LI is broken. If so, the system adds a first positive value to a fitness function associated with the test (operation 312). If not, the system determines if one or more branches that are relevant to the LI (e.g., branches where variables defining the LI update value) are covered by the test (operation 314). If so, the system adds a second positive value to the fitness function associated with the test (operation 316). The second positive value is less than the first positive value. If not, the system updates the test based on the fitness function (operation 318) and determines if sufficient tests have been generated (operation 320). If so, the operation ends. If not, the system re-executes the test (operation 306).

If the system is able to generate a counterexample test to break an LI, the LI will no longer be recommended to the programmer as an invariant. On the other hand, no such counterexample can be found for a true invariant. There is also the possibility that, although an LI is an incidental invariant, the counterexample generator fails to generate a counterexample test for various reasons. In such a scenario, the system can provide a likelihood score indicating the likelihood that the LI is an invariant, and such a likelihood score can be computed based on the efforts and behavior of the counterexample generator. In some embodiment, the system can generate the likelihood score by considering the coverage of the candidate tests created while the counterexample generator attempts to generate counterexamples. If the counterexample generator uses a fuzzing technique to generate counterexamples, the likelihood score can be determined based on a ratio of the number of input permutations tested to the total size of the input domain. If the counterexample generator uses the program-analysis technique to generate counterexamples, the likelihood score can be determined based on the branch and path coverage of the executed tests. If the counterexample generator uses the search-based technique to generate counterexamples, the likelihood score can be determined based on the number of tests generated in the process and their fitness.

The system can then rank those unbroken LIs based on their likelihood scores and present a set of top-ranked LIs to the programmer, thus facilitating the programmer in their further software development efforts. In some embodiments, after the system provides the set of LIs to the programmer, the programmer can manually determine if any LI is incidental or not. For an incidental invariant, the programmer can also manually add a counterexample test to the test suite. By incorporating a counterexample test generator, one can improve the reliability of the LI-detector, reducing the likelihood of incidental invariants being falsely identified.

Figure 4:
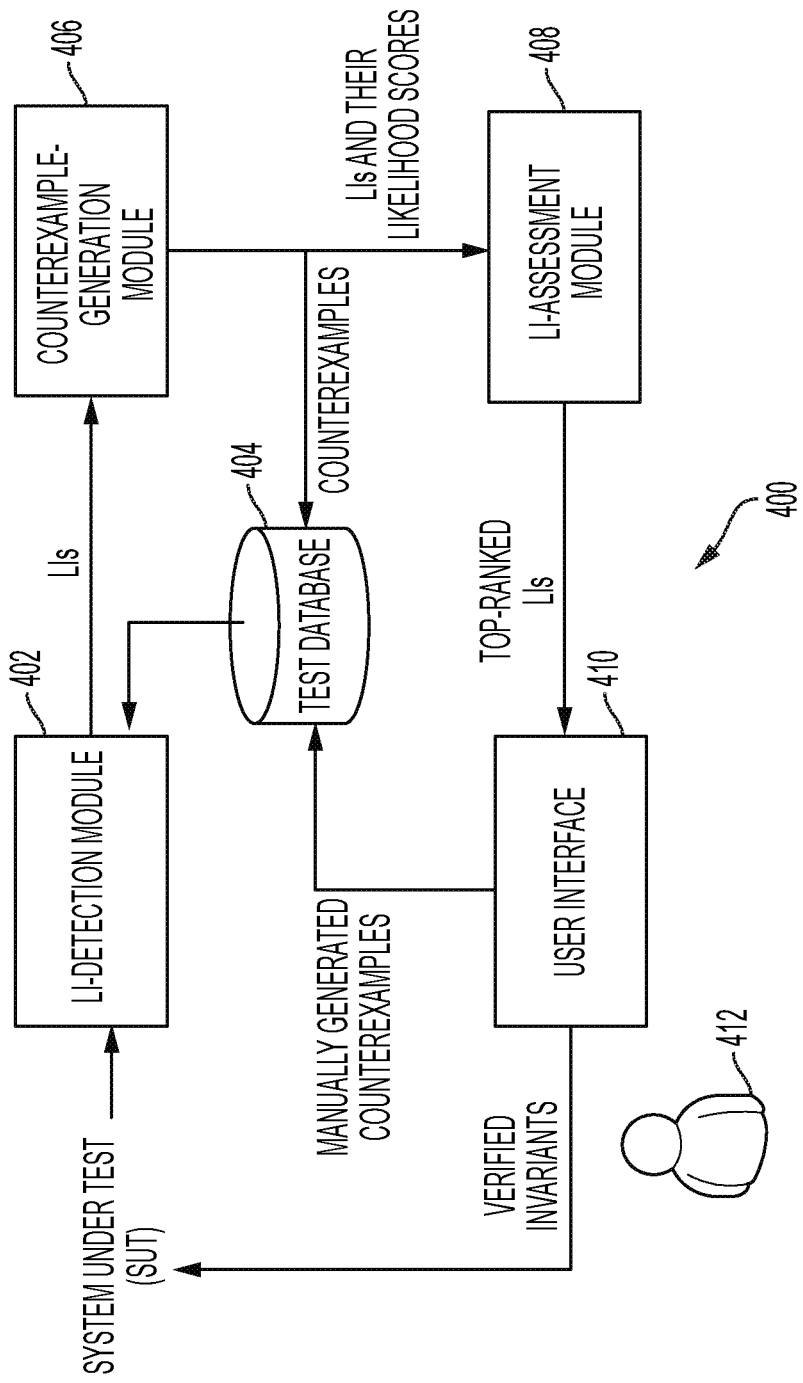
FIG. 4 illustrates an exemplary reliable LI-detection system, according to one embodiment.

FIG. 4 illustrates an exemplary reliable LI-detection system, according to one embodiment. Reliable LI-detection system 400 can include an LI-detection module 402, a test database 404, a counterexample-generation module 406, an LI-assessment module 408, and a user interface 410.

LI-detection module 402 can receive a software SUT and use conventional LI detection techniques to output a list of LIs. More specifically, LI-detection module 402 can receive a set of tests from test database 404 and execute the tests. LI-detection module 402 can then inspect runtime values of variables included in the SUT during all test executions and generalize properties of the variables that hold across all observed executions. For instance, exemplary properties of a numeric variable can include: being a constant, being non-zero, belonging to a range, having a linear relationship with another variable in the same lexical scope, etc. Depending on the type of target variable, LI-detection module 402 can apply different kinds of rules to generalize its property. For example, LI-detection module 402 can check pointer variables for nullity (i.e., determining whether a pointer variable is null). On the other hand, LI-detection module 402 can check collection variables using an ordering predicate, such as a predicate that indicates whether or not the collection has been sorted.

Based on the generalized properties of the variables in the SUT, LI-detection module 402 can output a list of LIs to counterexample-generation module 406. The list of LIs can include true invariants as well as incidental invariants that are falsely identified by LI-detection module 402. Counterexample-generation module 406 can include multiple sub-modules, such as a fuzzing sub-module, a program-analysis sub-module, and a heuristic-search sub-module. Counterexample-generation module 406 attempts to generate one or more counterexample tests for each LI using one or more of the sub-modules. In some embodiments, only one sub-module will be activated. In alternative embodiments, if one sub-module fails to generate a counterexample, a different sub-module will be activated. Depending on the particular structure and/or type of input of the SUT, a particular sub-module may be preferred. If a counterexample is successfully generated for an LI (i.e., execution of the test breaks the LI), counterexample-generation module 406 labels the LI as an incidental invariant and adds the counterexample test to the test suite stored in test database 404. In one embodiment, counterexample-generation module 406 may present the LI and the counterexample test to a programmer to allow the programmer to verify the LI as incidental and manually label the LI as an incidental invariant.

Once the test suite stored in test database 404 is updated (e.g., by including the counterexample tests), LI-detection module 402 can re-run the tests to output a new, refined set of LIs. After a number of iterations, the LI list converges. No counterexample is successfully generated for the remaining LIs in the converged list of LIs outputted by LI-detection module 402. Counterexample-generation module 406 can then compute a likelihood score for each of the remaining LIs to indicate the likelihood or a confidence level regarding the LI being a true invariant. Such a likelihood score can be computed based on the effort and behavior (e.g., the number of tests generated and/or the code coverage ratio the generated tests) of counterexample-generation module 406 while it attempts to generate the counterexamples.

Counterexample-generation module 406 sends the remaining LIs and their likelihood score to LI-assessment module 408, which can rank the remaining LIs based on their likelihood or confidence scores. In some embodiments, LI-assessment module 408 can select, from the remaining LIs, a set of top-ranked LIs to be presented to a user (e.g., the software developer). The number of top-ranked LIs to be sent to the user can be configurable, either by the user or by the system automatically. The user can then make a determination regarding whether an LI can be considered as an invariant or not based on the user's knowledge of the SUT. In alternative embodiments, LI-assessment module 408 can automatically make such a determination based on the likelihood score. For example, if the search space of the SUT is completely covered by the generated tests, LI-assessment module 408 can be confident that the LI is a true invariant. LI-assessment module 408 can also label an LI as a verified invariant if the LI has a likelihood or confidence score that is higher than a threshold value. The particular threshold value can be determined based on the type of test-generation approach used by counterexample-generation module 406.

The output of LI-assessment module 408 can be presented to a user (e.g., user 412) via an interactive user interface 410. More particularly, via user interface 410, a user (e.g., a programmer) can view the set of top-ranked LIs and make a determination on whether these LIs are true invariants or not. For each LI, user interface 410 can include a minimal test (a test that covers the code regions affecting the LI) that includes an assertion that verifies the LI. If the user confirms that the LI is a true invariant, the LI can be added to a list of confirmed invariants. In some embodiments, the confirmed LIs can be returned to the SUT (e.g., having the confirmed LIs explicitly annotated). If the user rejects the LI as a true invariant, the user may manually enter a counterexample test for the LI via user interface 410, and such manually entered counterexample test can be added to the test suite stored in test database 404. This can ensure that in the next round of test execution, these LIs will not be identified.

Figure 5:
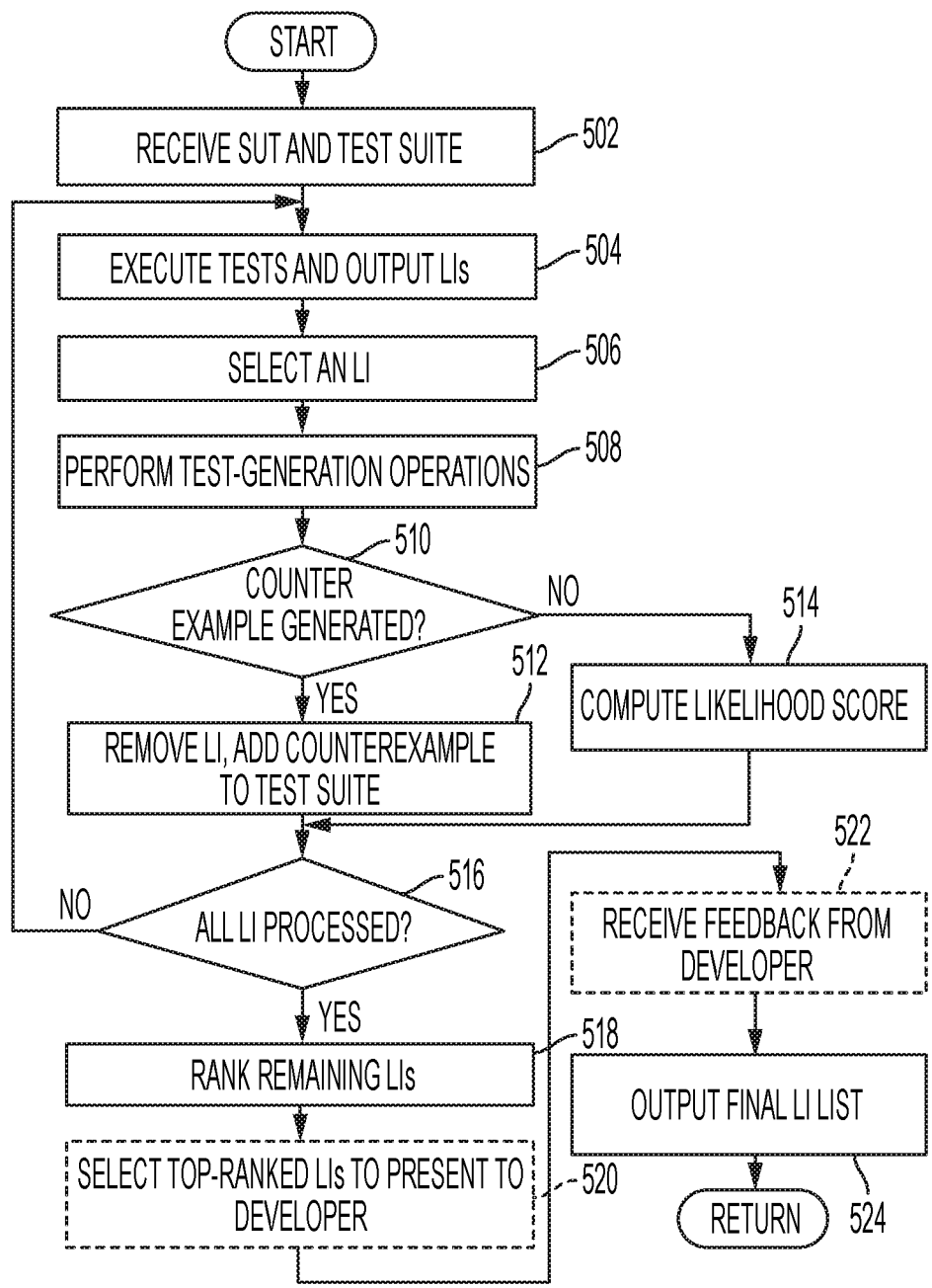
FIG. 5 presents a flowchart illustrating exemplary operations of the reliable LI-detection system, according to one embodiment.

FIG. 5 presents a flowchart illustrating exemplary operations of the reliable LI-detection system, according to one embodiment. During operation, the system receives an SUT (e.g., a computer program under development) and a test suite comprising a series of test cases (operation 502). The system executes the tests and outputs a number of LIs based on the test executions (operation 504). More specifically, the system can inspect the concrete values of all variables in the SUT during all test executions and generalize properties of certain variables that hold across all observed executions. In some embodiments, a conventional LI-detection tool (e.g., Daikon invariant detector) can use the SUT and the test suite as input and output a set of LIs.

The system can then select an LI (operation 506) and perform test-generation operations attempting to generate a counterexample test that can break the LI (operation 508). As discussed previously, the system can implement one or more techniques (e.g., fuzzing, program analysis, and heuristic search) while attempting to generate the counterexample test. Depending on the type of inputs and/or the type of LI, the system may use a particular technique to generate counterexample tests. In some embodiments, if one technique fails to generate a counterexample for an LI, the system can use a different technique. More specifically, while performing the fuzzing-based test generation, the system can compute a gradient based on the amount of change in the value of the variable describing the LI with respect to the amount of change in the input, and use the gradient to guide the size and sign of the input changes in subsequent iterations of fuzzing. While performing the program-analysis-based test generation, the system can identify at least one variable describing the LI, and instrument the SUT by adding a code branch that can monitor the values of the variable during test execution. The system can then use a static or dynamic program-analysis technique to generate a test that passes through the added code branch in order to verify if the LI is broken. While performing the heuristic-search-based test generation, the system executes a generated test and computes a fitness function for the test based on the outcome of the test execution. More specifically, a positive value can be added to the fitness function if the test covers a code branch relevant to the LI, and an even higher value can be added if executing the test breaks the LI.

The system determines if a counterexample test is successfully generated (operation 510). If so, the system removes the LI from the list of LIs and adds the counterexample test to the existing test suite (operation 512). If no counterexample test is generated, the system computes a likelihood score (also referred to as a confidence score) for the LI (operation 514). Depending on the technique used to generate the counterexample, the likelihood score can be computed differently. In general, the system computes the likelihood based on the extensiveness (e.g., for the fuzzing technique) or complexity (e.g., for the program-analysis or the heuristic search technique) of the test-generation process. When multiple test-generation techniques are used, the confidence score can be summed. In one embodiment, the system can also assign a certain weight factor to each test-generation technique based on whether a test-generation technique is best suited for generating counterexamples for a particular LI in a particular SUT.

Subsequently, the system determines if all LIs in the LI list have been processed (i.e., if the system has attempted to generate counterexample tests for all of the LIs in the list) (operation 516). If not, the system re-executes the test suite and outputs a new LI list (operation 504). Because the test suite now includes all previously generated counterexamples, incidental invariants corresponding to those counterexample tests will not be included in the new LI list. Moreover, running the additional tests may cover code regions that have not been covered previously or provide inputs that were not used previously, thus further increasing the accuracy and reliability of the system.

If the LI list converges (i.e., the system has attempted and failed to generate a counterexample test for all remaining LIs on the list), the system ranks the remaining LIs on the list based on their likelihood score (operation 518). The system can optionally select a set of top-ranked LIs from the remaining LIs to present to the software developer (operation 520) and subsequently receives the developer's feedback regarding whether the LIs are invariants or incidental invariants (operation 522). Based on the developer's feedback, the system can provide a final output of a list of verified LIs (operation 524). The software developer can approve or reject an LI (e.g., based on their experience about the SUT and the LI). The approved LI will be added to a list of verified LIs and returned to the SUT (e.g., as explicit annotations). While rejecting an LI, the software developer can manually add a counterexample test for the rejected LI to the test suite.

Compared with conventional LI-detection systems, this novel reliable LI-detection system improves the accuracy of LI detection. More specifically, by generating counterexamples for incidental LIs, the system significantly reduces the likelihood of incidental LIs being detected and treated as invariants. The automated process increases system efficiency in generating the tests, and the ability to implement multiple techniques allows the system to work with different types of software SUTs. Moreover, by providing likelihood rankings to unbroken LIs, the system provides vital information to software developers regarding the quality of the LIs inferred by the system.

Figure 6:
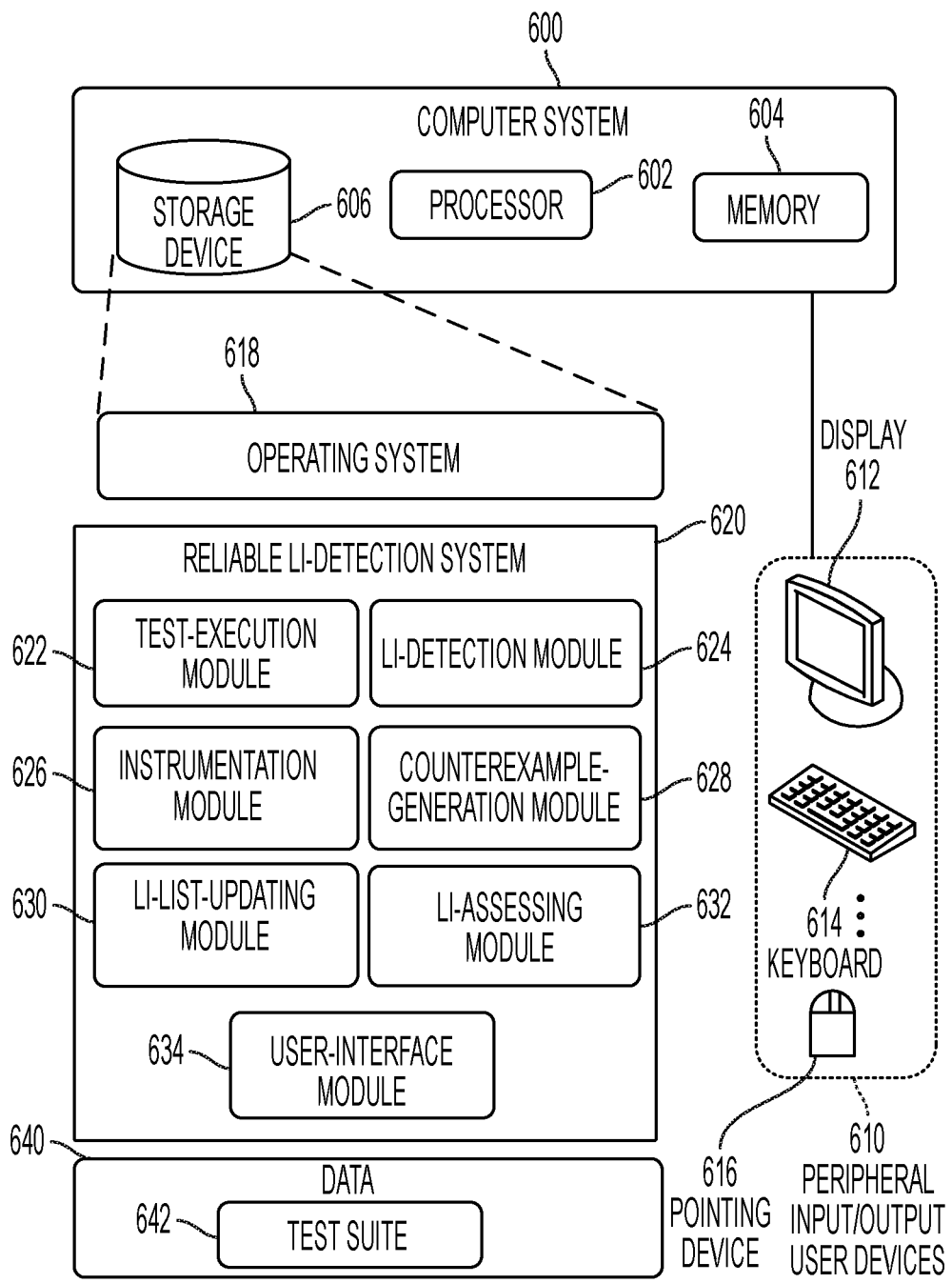
FIG. 6 illustrates an exemplary computer system, according to one embodiment.

FIG. 6 illustrates an exemplary computer system, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a reliable LI-detection system 620, and data 640.

Reliable LI-detection system 620 can include instructions, which when executed by computer system 600, can cause computer system 600 or processor 602 to perform methods and/or processes described in this disclosure. Specifically, reliable LI-detection system 620 can include instructions for executing tests (test-execution module 622), instructions for detecting an initial set of LIs based on executed tests (LI-detection module 624), instructions for instrumenting the SUT (instrumentation module 626), instructions for generating counterexample tests for LIs (counterexample-generation module 628), instructions for updating the LI list (LI-list-updating module 630), instructions for assessing LIs (LI-assessing module 632), and instructions for providing an interactive user interface (user-interface module 634). Data 640 can include a test suite 642.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for identifying invariants in a software system, the method comprising:
   executing, by a computer, a test suite comprising a plurality of tests associated with the software system to output a list of likely invariants in the software system;
   performing a test-generation operation attempting to generate counterexample tests for the likely invariants, wherein generating a respective counterexample test comprises implementing a fuzzing-based test-generation technique, which comprises:
      modifying an input of a test in the test suite;
      monitoring a value of a variable describing a likely invariant while executing the test;
      computing a gradient based on a change in the input and a change in the monitored value of the variable;
      generating a new test by modifying the input based on the computed gradient; and
      determining whether the new test is a counterexample test; and
   in response to a counterexample test being successfully generated for a first likely invariant, removing the first likely invariant from the list of likely invariants and adding the successfully generated counterexample test to the test suite.

2. The computer-implemented method of claim 1, further comprising:
   in response to failing to generate a counterexample test for a second likely invariant, computing a likelihood score for the second likely invariant based on the test-generation operation, wherein the likelihood score indicates a likelihood of the second likely invariant being a true invariant.

3. The computer-implemented method of claim 2, further comprising:
   ranking remaining likely invariants in the list of likely invariants based on their likelihood scores; and
   outputting a set of top-ranked likely invariants.

4. The computer-implemented method of claim 3, further comprising:
   presenting the set of top-ranked likely invariants to a software developer; and
   receiving feedback from the software developer, the feedback indicating whether a likely invariant is confirmed as an invariant.

5. The computer-implemented method of claim 1, wherein generating a respective counterexample test further comprises implementing a program-analysis-based test-generation technique, which comprises:
   identifying at least a variable describing a likely invariant;
   instrumenting the software system to add a code branch to monitor runtime values of the variable; and
   using a program-analysis technique to generate a test to pass through the added code branch.

6. The computer-implemented method of claim 1, wherein generating a respective counterexample test further comprises implementing a heuristic-search-based test-generation technique, which comprises:
   generating and executing a test; and
   computing a fitness function for the generated test based on whether executing the test breaks a likely invariant or whether the test covers a code branch associated with the likely invariant.

7. A non-transitory computer-readable storage medium storing instructions that when executed by a computer cause the computer to perform a method for identifying invariants in a software system, the method comprising:
   executing, by a computer, a test suite comprising a plurality of tests associated with the software system to output a list of likely invariants in the software system;
   performing a test-generation operation attempting to generate counterexample tests for the likely invariants, wherein generating a respective counterexample test comprises implementing a fuzzing-based test-generation technique, which comprises:
      modifying an input of a test in the test suite;
      monitoring a value of a variable describing a likely invariant while executing the test;
      computing a gradient based on a change in the input and a change in the monitored value of the variable;
      generating a new test by modifying the input based on the computed gradient; and
      determining whether the new test is a counterexample test; and
   in response to a counterexample test being successfully generated for a first likely invariant, removing the first likely invariant from the list of likely invariants and adding the successfully generated counterexample test to the test suite.

8. The non-transitory computer-readable storage medium of claim 7, wherein the method further comprises:
   in response to failing to generate a counterexample test for a second likely invariant, computing a likelihood score for the second likely invariant based on the test-generation operation, wherein the likelihood score indicates a likelihood of the second likely invariant being a true invariant.

9. The non-transitory computer-readable storage medium of claim 8, wherein the method further comprises:
   ranking remaining likely invariants in the list of likely invariants based on their likelihood scores; and
   outputting a set of top-ranked likely invariants.

10. The non-transitory computer-readable storage medium of claim 9, wherein the method further comprises:
    presenting the set of top-ranked likely invariants to a software developer; and
    receiving feedback from the software developer, the feedback indicating whether a likely invariant is confirmed as an invariant.

11. A computer system for identifying invariants in a software system, comprising:
    a processor; and
    a storage device storing instructions that when executed by the processor cause the processor to perform a method, the method comprising:
       executing a test suite comprising a plurality of tests associated with the software system to output a list of likely invariants in the software system;
       performing a test-generation operation attempting to generate counterexample tests for the likely invariants, wherein generating a respective counterexample test comprises implementing a fuzzing-based test-generation technique, which comprises:
          modifying an input of a test in the test suite;
          monitoring a value of a variable describing a likely invariant while executing the test;
          computing a gradient based on a change in the input and a change in the monitored value of the variable;
          generating a new test by modifying the input based on the computed gradient; and determining whether the new test is a counterexample test; and in response to a counterexample test being successfully generated for a first likely invariant, removing the first likely invariant from the list of likely invariants and adding the successfully generated counterexample test to the test suite.

12. The computer system of claim 11, wherein the method further comprises:

in response to failing to generate a counterexample test for a second likely invariant, computing a likelihood score for the second likely invariant based on the test-generation operation, wherein the likelihood score indicates a likelihood of the second likely invariant being a true invariant.

13. The computer system of claim 12, wherein the method further comprises:

ranking remaining likely invariants in the list of likely invariants based on their likelihood scores; and outputting a set of top-ranked likely invariants.

14. The computer system of claim 11, wherein generating a respective counterexample test further comprises implementing a program-analysis-based test-generation technique, which comprises:

identifying at least a variable describing a likely invariant;

instrumenting the software system to add a code branch to monitor runtime values of the variable; and using a program-analysis technique to generate a test to pass through the added code branch.

15. The computer system of claim 11, wherein generating a respective counterexample test further comprises implementing a heuristic-search-based test-generation technique, which comprises:

generating and executing a test;

computing a fitness function for the generated test based on whether executing the test breaks a likely invariant or whether the test covers a code branch associated with the likely invariant.

\* \* \* \* \*